United States Patent
Ishizaki et al.

(10) Patent No.: US 9,688,840 B2
(45) Date of Patent: Jun. 27, 2017

(54) 2-CYANOACRYLATE ADHESIVE COMPOSITION

(71) Applicant: TOAGOSEI CO., LTD., Tokyo (JP)

(72) Inventors: Kenichi Ishizaki, Nagoya (JP); Yushi Ando, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days.

(21) Appl. No.: 15/124,316

(22) PCT Filed: Feb. 27, 2015

(86) PCT No.: PCT/JP2015/055795
§ 371 (c)(1),
(2) Date: Sep. 7, 2016

(87) PCT Pub. No.: WO2015/137153
PCT Pub. Date: Sep. 17, 2015

(65) Prior Publication Data
US 2017/0015813 A1      Jan. 19, 2017

(30) Foreign Application Priority Data

Mar. 11, 2014   (JP) .................................. 2014-047129

(51) Int. Cl.
| | | |
|---|---|---|
| *C08K 5/42* | (2006.01) | |
| *C08K 5/19* | (2006.01) | |
| *C08K 5/3462* | (2006.01) | |
| *C08K 5/3445* | (2006.01) | |
| *C09J 4/00* | (2006.01) | |
| *C09J 7/02* | (2006.01) | |
| *C09J 11/06* | (2006.01) | |
| *C09J 135/04* | (2006.01) | |
| *C08F 222/32* | (2006.01) | |
| *C08K 5/43* | (2006.01) | |

(52) U.S. Cl.
CPC .............. *C08K 5/42* (2013.01); *C08F 222/32* (2013.01); *C08K 5/19* (2013.01); *C08K 5/3445* (2013.01); *C08K 5/3462* (2013.01); *C09J 4/00* (2013.01); *C09J 135/04* (2013.01); *C09J 2205/102* (2013.01)

(58) Field of Classification Search
CPC .... C09J 4/00; C09J 11/06; C08K 5/19; C08K 5/43; C08K 5/42

USPC ....... 156/331.2; 526/298; 524/709, 745, 850
See application file for complete search history.

(56) References Cited

U.S. PATENT DOCUMENTS

| | | | |
|---|---|---|---|
| 3,836,565 A * | 9/1974 | Brinkmann | ............. C08F 22/30 558/303 |
| 4,460,759 A | 7/1984 | Robins | |
| 2008/0003196 A1* | 1/2008 | Jonn et al. | .............. A61L 24/06 424/78.08 |
| 2010/0030258 A1 | 2/2010 | Badejo et al. | |
| 2015/0225627 A1 | 8/2015 | Ishizaki et al. | |

FOREIGN PATENT DOCUMENTS

| | | |
|---|---|---|
| GB | 2228943 A | 9/1990 |
| JP | S53-129231 A | 11/1978 |
| JP | S58-089674 A | 5/1983 |
| JP | S60-179482 A | 9/1985 |
| JP | S62-100567 A | 5/1987 |
| JP | S63-128088 A | 5/1988 |
| JP | 2000-044891 A | 2/2000 |
| JP | 2000-73014 A | 3/2000 |
| JP | 2000-516289 A | 12/2000 |
| JP | 2011-529979 A | 12/2011 |
| WO | 9807801 A1 | 2/1998 |
| WO | 2014/042082 A1 | 3/2014 |

OTHER PUBLICATIONS

International Search Report for PCT/JP2015/055795 mailed Jun. 2, 2015; English Translation submitted herewith (5 Pages).

* cited by examiner

*Primary Examiner* — Fred M Teskin
(74) *Attorney, Agent, or Firm* — Fitch, Even, Tabin & Flannery, LLP

(57) ABSTRACT

An adhesive composition is provided which is excellent in adhesion rate on non-polar hard-to-bond materials and bond gap curability, and further is good in storage stability. It is a 2-cyanoacrylate-based adhesive composition which includes (a) a 2-cyanoacrylic acid ester and (b) an onium salt represented by the following general formula (1):

$$nC^+A^-_n\text{-}X \qquad (1)$$

wherein, in formula (1), $C^+$ represents an onium cation, $A^-$ represents at least one anion selected from the group consisting of $-SO_3^-$, $-OSO_3^-$ and a specific imide anion, X represents a linking group which connects at least two anions together, and n is an integer of 2 or more.

21 Claims, No Drawings

2-CYANOACRYLATE ADHESIVE COMPOSITION

CROSS-REFERENCE TO RELATED APPLICATIONS

This application is a U.S. national phase application filed under 35 U.S.C. §371 of International Application No. PCT/JP2015/055795, filed Feb. 27, 2015, designating the United States, which claims priority from Japanese Patent Application No. 2014-047129, filed Mar. 11, 2014, and the complete disclosures of which applications are hereby incorporated herein by reference in their entirety for all purposes.

TECHNICAL FIELD

The present invention relates to a 2-cyanoacrylate-based adhesive composition containing a 2-cyanoacrylic acid ester as the principal component.

BACKGROUND ART

A 2-cyanoacrylate-based adhesive composition quickly establishes a strong bonding among various types of materials based on the unique anion polymerization characteristics exhibited by its principal component, 2-cyanoacrylic acid ester, which initiates polymerization under the presence of weak anion provided by slight moisture or the like attached to a surface of an adherend. Accordingly, it is used as the so-called instantaneous adhesive in a wide range of fields including industrial, medical, and household applications. However, since the setting of the 2-cyanoacrylate-based adhesive composition proceeds by anion polymerization, problems of lowered adhesion rate and insufficient adhesion strength resulting from inhibition of anion polymerization have been found when adherends are made of wood which is acidic or a metal which easily forms an oxide skin. Furthermore, problems of anion polymerization suppression and lowered adhesion rate have been found when adherends are hard-to-bond materials because of low polarity like natural rubbers. Furthermore, such a problem that it takes really long time to cure at a site where a gap exists between adherends to be bonded together (hereinafter referred to as "bond gap curability") has been found.

To overcome such problems, various types of additives have been proposed heretofore. For instance, Patent Document 1 discloses an adhesive composition containing crown ethers, and Patent Document 2 discloses an adhesive composition containing polyalkylene oxides. Further, Patent Documents 3 and 4 disclose adhesive compositions containing calixarenes. Patent Document 5 describes using a phase transfer catalyst as a hardening accelerator for the 2-cyanoacrylate-based composition. Furthermore, Patent Document 6 describes a 2-cyanoacrylate-based composition containing a trihalogenated alkanesulfonate as a composition that is excellent in storage stability and is hardened quickly.

CONVENTIONAL TECHNICAL DOCUMENTS

Patent Documents

Patent Document 1: Japanese Patent Publication (Laid-open) No. Sho. 53-129231
Patent Document 2: Japanese Patent Publication (Laid-open) No. Sho. 63-128088
Patent Document 3: Japanese Patent Publication (Laid-open) No. Sho. 60-179482
Patent Document 4: Japanese Patent Publication (Laid-open) No. 2000-44891
Patent Document 5: British Patent Publication GB2228943 specification
Patent Document 6: Japanese Patent Publication (Laid-open) No. 2000-73014

SUMMARY OF INVENTION

Problems to be Solved by the Invention

The adhesive compositions disclosed in Patent Documents 1 to 5 have accelerated adhesion rate for various adherends, however, with increasing demand on productivity, the adhesion rate on non-polar hard-to-bond materials and bond gap curability are still not satisfactory. The adhesive composition disclosed in Patent Document 6 is effective to have storage stability improved, but is still insufficient in bond gap curability.

The present invention is made in light of the aforementioned circumstances, and aims at providing an adhesive composition which is superior in adhesion rate for non-polar hard-to-bond materials and bond gap curability and further excellent in storage stability.

Means for Solving the Problems

The present inventors have found that an adhesive composition which is improved adhesion rate for non-polar hard-to-bond materials and bond gap curability and further superior in storage stability can be obtained by blending an onium salt having a specific polyfunctional structure with a 2-cyanoacrylic acid ester, and have accomplished the present invention.

The present invention is as follows:

1. A 2-cyanoacrylate-based adhesive composition which comprises (a) a 2-cyanoacrylic acid ester and (b) an onium salt represented by the following general formula (1):

$$nC^+A^-{}_n\text{-}X \tag{1}$$

wherein, in formula (1), $C^+$ represents an onium cation, $A^-$ represents at least one anion selected from the group consisting of $-SO_3^-$, $-OSO_3^-$ and an imide anion represented by the following formula (2), X represents a linking group which connects at least two anions together, and n is an integer of 2 or more.

$$\tag{2}$$

wherein, in formula (2), $R^1$ represents a fluorine atom, alkyl group, cycloalkyl group, perfluoroalkyl group, aryl group, aralkyl group, alkenyl group or alkynyl group.

2. The 2-cyanoacrylate-based adhesive composition according to the above item 1, wherein the cation of the onium salt (b) is at least one onium cation selected from a group consisting of a quaternary ammonium cation, a quaternary phosphonium cation, an imidazolium cation, a pyridinium cation, and a tertiary sulfonium cation.

3. The 2-cyanoacrylate-based adhesive composition according to the above item 1 or 2, wherein the anion of the onium salt (b) is at least one anion selected from a group consisting of —SO$_3^-$, —OSO$_3^-$, a fluorosulfonylimide anion and a perfluoroalkylsulfonylimide anion.

4. The 2-cyanoacrylate-based adhesive composition according to any one of the above items 1 to 3, wherein the linking group X in the above general formula (1) is a divalent linking group.

5. The 2-cyanoacrylate-based adhesive composition according to the above item 4, wherein the linking group X in the above general formula (1) is at least one divalent linking group selected from the group consisting of an alkylene group, a cycloalkylene group, an arylene group and a biphenyl group.

6. The 2-cyanoacrylate-based adhesive composition according to any one of the above items 1 to 5, wherein the content of the onium salt (b) is 10 to 20,000 ppm relative to 100 parts by mass of the 2-cyanoacrylic acid ester (a).

Effect of the Invention

The 2-cyanoacrylate-based adhesive composition according to the present invention contains a 2-cyanoacrylic acid ester and an onium salt with a polyfunctional structure linked via the linking group X, and thus is improved in adhesion rate for non-polar hard-to-bond materials and bond gap curability, and is also excellent in storage stability.

DESCRIPTION OF EMBODIMENTS

Details of the 2-cyanoacrylate-based adhesive composition (which is hereinafter often simply referred to as "adhesive composition") according to the present invention are described below.

The adhesive composition of the present invention contains (a) a 2-cyanoacrylic acid ester and (b) an onium salt having a specific structure.

As the "(a) 2-cyanoacrylic acid ester", 2-cyanoacrylic acid esters generally employed in this type of adhesive compositions can be used without any particular restriction. The 2-cyanoacrylic acid ester includes methyl, ethyl, chloroethyl, n-propyl, i-propyl, allyl, propargyl, n-butyl, i-butyl, n-pentyl, n-hexyl, cyclohexyl, phenyl, tetrahydrofurfuryl, heptyl, 2-ethylhexyl, n-octyl, 2-octyl, n-nonyl, oxononyl, n-decyl, n-dodecyl, methoxyethyl, methoxypropyl, methoxyisopropyl, methoxybutyl, ethoxyethyl, ethoxypropyl, ethoxyisopropyl, propoxymethyl, propoxyethyl, isopropoxyethyl, propoxypropyl, butoxymethyl, butoxyethyl, butoxypropyl, butoxyisopropyl, butoxybutyl, 2,2,2-trifluoroethyl, and hexafluoroisopropyl esters of 2-cyanoacrylic acid. These 2-cyanoacrylic acid esters can be used alone or in combination of two or more. Furthermore, among these 2-cyanoacrylic acid esters, 2-cyanoacrylic acid esters having an alkyl group with 3 or less carbon atoms are preferred since they are excellent in curability, and ethyl 2-cyanoacrylate is more preferred.

The adhesive composition according to the present invention contains "(b) an onium salt represented by the following general formula (1)". The onium salt is a compound that functions as a hardening accelerator of the adhesive composition and particularly improves adhesion rate for non-polar hard-to-bond materials and bond gap curability.

wherein, in formula (1), C$^+$ represents an onium cation, A$^-$ represents at least one anion selected from the group consisting of —SO$_3^-$, —OSO$_3^-$ and an imide anion represented by the following formula (2), X represents a linking group which connects at least two anions together, and n is an integer of 2 or more,

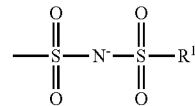

wherein, in formula (2), R$^1$ represents a fluorine atom, alkyl group, cycloalkyl group, perfluoroalkyl group, aryl group, aralkyl group, alkenyl group or alkynyl group.

The cations of the onium salt are not particularly limited as long as they can impart solubility in 2-cyanoacrylate to the onium salt, and include, for example, an onium cation represented by the following general formula (3), an imidazolium cation, a pyridinium cation, and an onium cation represented by the following general formula (4).

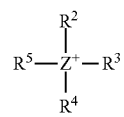

wherein, in formula (3), R$^2$ to R$^5$ each independently represents a non-substituted or substituted alkyl group, cycloalkyl group, aryl group, aralkyl group, alkenyl group or alkynyl group; otherwise, part or all of R$^2$ to R$^5$ may form a non-substituted or substituted 3 to 10 membered ring together with the atom represented by Z wherein the ring may contain a hetero atom such as O and S, provided that R$^2$ to R$^5$ which do not involve the formation of the ring are the same as defined hereinbefore; and Z represents a nitrogen atom or phosphorus atom. Specific examples of the above substituted alkyl group include, for example, an alkoxy group and an alkanoyl group. The above non-substituted or substituted alkyl group preferably has 1 to 20 carbon atoms, and more preferably 1 to 16 carbon atoms. When part of R$^2$ to R$^5$ form a ring, the ring is, in general, constituted by 2 to 3 of R$^2$ to R$^5$. Specific examples of the compound represented by the formula (3) in which two of R$^2$ to R$^5$ form a ring include piperidinium cation, morpholinium cation, and pyrrolidinium cation.

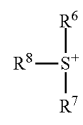

wherein, in formula (4), R$^6$ to R$^8$ each independently represents a non-substituted or substituted alkyl group, cycloalkyl group, aryl group, aralkyl group, alkenyl group or alkynyl group; otherwise, part or all of R$^6$ to R$^8$ may form a non-substituted or substituted 3 to 10 membered ring together with the sulfur atom wherein the ring may contain a hetero atom such as O and S, provided that R$^6$ to R$^8$ which do not involve the formation of the ring are the same as defined hereinbefore. Specific examples of the above substituted alkyl group include, for example, an alkoxy group and an alkanoyl group. The above non-substituted or substituted alkyl group preferably has 1 to 20 carbon atoms, and more preferably 1 to 16 carbon atoms.

Representative examples of the onium cations represented by the formula (3) include quaternary ammonium cations, quaternary phosphonium cations, and the like.

Specific examples of the quaternary ammonium cations include tetraalkylammonium cations such as tetramethylammonium, ethyltrimethylammonium, diethyldimethylammonium, triethylmethylammonium, tetraethylammonium, tetra-n-butylammonium, trimethyl-n-propylammonium, trimethyl-isopropylammonium, n-butyltrimethylammonium, isobutyltrimethylammonium, t-butyltrimethylammonium, n-hexyltrimethylammonium, dimethyldi-n-propylammonium, dimethyldiisopropylammonium, dimethyl-n-propylisopropylammonium, methyltri-n-propylammonium, methyltri-isopropylammonium, methyldi-n-propylisopropylammonium, methyl-n-propyldiisopropylammonium, triethyl-n-propylammonium, triethylisopropylammonium, n-butyltriethylammonium, triethylisobutylammonium, t-butyltriethylammonium, di-n-butyldimethylammonium, diisobutyldimethylammonium, di-t-butyldimethylammonium, n-butylethyldimethylammonium, isobutylethyldimethylammonium, t-butylethyldimethylammonium, n-butylisobutyldimethylammonium, n-butyl-t-butyldimethylammonium, t-butylisobutyldimethylammonium, diethyldi-n-propylammonium, diethyldiisopropylammonium, diethyl-n-propylisopropylammonium, ethyltri-n-propylammonium, ethyltri-isopropylammonium, ethylisopropyldi-n-propylammonium, ethyldiisopropyl-n-propylammonium, diethylmethyl-n-propylammonium, ethyldimethyl-n-propylammonium, ethylmethyldi-n-propylammonium, diethylisopropylmethylammonium, ethylisopropyldimethylammonium, ethyldiisopropylmethylammonium, ethylmethyl-n-propylisopropylammonium, tetra-n-propylammonium, tetra-isopropylammonium, tri-isopropyl-n-propylammonium, diisopropyldi-n-propylammonium, isopropyl-tri-n-propylammonium, butyltrimethylammonium, trimethylpentylammonium, hexyltrimethylammonium, heptyltrimethylammonium, trimethyloctylammonium, trimethylnonylammonium, decyltrimethylammonium, trimethylundecylammonium, dodecyltrimethylammonium, didecyldimethylammonium, dilauryldimethylammonium, dimethyldistyrylammonium, dimethyldioctadecylammonium, dimethyldioctylammonium, dimethyldipalmitylammonium, ethylhexadecyldimethylammonium, hexyldimethyloctylammonium, dodecyl(ferrocenylmethyl)dimethylammonium, N-methyl homatropinium and the like; aromatic alkyl-group substituted ammonium cations such as benzyltrimethylammonium, benzyltributylammonium, benzyldodecyldimethylammonium, and the like; aromatic substituted ammonium cations such as trimethylphenylammonium, tetraphenylammonium, and the like; and aliphatic cyclic ammonium cations such as pyrrolydinium (such as 1,1-dimethylpyrrolydinium, 1-ethyl-1-methylpyrrolydinium, 1,1-diethylpyrrolydinium, 1,1-tetramethylenepyrrolydinium, and 1-butyl-1-methylpyrrolydinium), piperidinium (such as 1,1-dimethylpiperidinium, 1-ethyl-1-methylpiperidinium, 1,1-diethylpiperidinium, and 1-butyl-1-methylpiperidinium), and morpholinium (such as 1,1-dimethylmorpholinium, 1-ethyl-1-methylmorpholinium, and 1,1-diethylmorpholinium).

Specific examples of the quaternary phosphonium cations include cations such as tetramethylphosphonium, triethylmethylphosphonium, and tetraethylphosphonium.

Specific examples of the imidazolium cations include cations such as 1,3-dimethylimidazolium, 1,2,3-trimethylimidazolium, 1-ethyl-3-methylimidazolium, 1-ethyl-2,3-dimethylimidazolium, 1-methyl-3-n-octylimidazolium, 1-hexyl-3-methylimidazolium, 1,3-diethylimidazolium, 1,2-diethyl-3-methylimidazolium, 1,3-diethyl-2-methylimidazolium, 1,2-dimethyl-3-n-propylimidazolium, 1-n-butyl-3-methylimidazolium, 1-n-butyl-2,3-dimethylimidazolium, 1,2,4-trimethyl-3-n-propylimidazolium, 1,2,3,4-tetramethylimidazolium, 1,2,3,4,5-pentamethylimidazolium, 2-ethyl-1,3-dimethylimidazolium, 1,3-dimethyl-2-n-propylimidazolium, 1,3-dimethyl-2-n-pentylimidazolium, 2-n-heptyl-1,3-dimethylimidazolium, 1,3,4-trimethylimidazolium, 2-ethyl-1,3,4-trimethylimidazolium, 1,3-dimethylbenzimidazolium, 3-methyl-1-phenylimidazolium, 1-benzyl-3-methylimidazolium, 2,3-dimethyl-1-phenylimidazolium, 1-benzyl-2,3-dimethylimidazolium, 1,3-dimethyl-2-phenylimidazolium, 2-benzyl-1,3-dimethylimidazolium, 1,3-dimethyl-2-n-undecylimidazolium, and 1,3-dimethyl-2-n-heptadecylimidazolium.

The pyridinium cations include cations such as 1-methylpyridinium, 1-ethylpyridinium, 1-n-propylpyridinium, 1-isopropylpyridinium, 1-n-butylpyridinium, and 1-n-butyl-3-methylpyridinium.

Specific examples of the tertiary sulfonium cations represented by the general formula (4) above include cations such as trimethylsulfonium, triethylsulfonium, tripropylsulfonium, and triphenylsulfonium.

Among the aforementioned onium cations, preferred are quaternary ammonium cations, the quaternary phosphonium cations, imidazolium cations, pyridinium cations, or tertiary sulfonium cations from the viewpoint of exhibiting excellent solubility to 2-cyanoacrylic acid ester and good balance between high curing acceleration property and storage stability of the adhesive composition; and further preferred are quaternary ammonium cations, imidazolium cations or pyridinium cations.

Next, the anion of the onium salt has a structure in which at least one anion selected from the group consisting of $-SO_3^-$, $-OSO_3^-$ and an imide anion represented by the following formula (2) is linked via the linking group X. When the anion is another anion than the above described ones, for example, phosphonate anion and alkylphosphate, the onium salt becomes basic and thus causes polymerization of 2-cyanoacrylic acid esters during storage, thereby leading to degradation of storage stability.

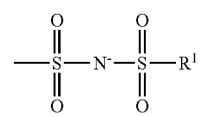

(2)

wherein, in formula (2), $R^1$ represents a fluorine atom, alkyl group, cycloalkyl group, perfluoroalkyl group, aryl group, aralkyl group, alkenyl group or alkynyl group.

Among the above described anions, preferred are $-SO_3^-$, $-OSO_3^-$, a fluorosulfonylimide anion and a perfluoroalkylsulfonylimide anion from the viewpoint of adhesion rate for non-polar hard-to-bond materials, bond gap curability and storage stability of the adhesive composition, and more preferred are $-SO_3^-$ and $-OSO_3^-$.

The linking group X which connects the above described anions together is preferably a divalent to tetravalent linking group from the viewpoint of solubility of the onium salt in 2-cyanoacrylic acid esters, more preferably a divalent linking group. Also, the linking group X is not particularly limited as long as it can provide solubility to 2-cyanoacrylic acid esters. The linking group is preferably an organic group. Specific examples thereof include a structure selected from the group consisting of a hydrocarbon group, which may have a substituent, an aromatic ring, a double bond, a triple bond, a cyclic structure, an ester bond, an ether bond, a thioether bond, a siloxane bond and a combination of these, and particularly preferred is an alkylene group, a cycloalkylene group, an arylene group or a biphenyl group. The above substituent includes an alkanoyl group, a halogen atom, a silyl group, a nitro group, an azide group, a cyano group, a nitroso group and the like.

In the above general formula (1), n is determined by the valency of the linking group X, and n is preferably an integer of 2-4, and more preferably n=2.

The onium salt used in the present invention is not particularly limited so long as it is a combination of the cations and the anions described hereinbefore. Specific examples of the onium salt having a divalent linking group include bis(tetraethylammonium) 1,2-ethanedisulfonate, bis(tetra-n-butylammonium) 1,2-ethanedisulfonate, bis(methyltri-n-octylammonium) 1,2-ethanedisulfonate, bis(amyltriethylammonium) 1,2-ethanedisulfonate, bis(cyclohexyltrimethylammonium) 1,2-ethanedisulfonate, bis(1-ethyl-3-methylimidazolium) 1,2-ethanedisulfonate, bis(1-ethyl-2,3-dimethylimidazolium) 1,2-ethanedisulfonate, bis(1-butyl-3-methylimidazolium) 1,2-ethanedisulfonate, bis(1-butyl-2,3-dimethylimidazolium) 1,2-ethanedisulfonate, bis(1-methyl-3-n-octylimidazolium) 1,2-ethanedisulfonate, bis(1-hexyl-3-methylimidazolium) 1,2-ethanedisulfonate, bis(2-ethyl-1,3-dimethylimidazolium) 1,2-ethanedisulfonate, bis(1,3-dimethyl-2-n-propylimidazolium) 1,2-ethanedisulfonate, bis(1,3-dimethyl-2-n-pentylimidazolium) 1,2-ethanedisulfonate, bis(2-n-heptyl-1,3-dimethylimidazolium) 1,2-ethanedisulfonate, bis(1-ethyl-1-methylpiperidinium) 1,2-ethanedisulfonate, bis(1-butyl-1-methylpiperidinium) 1,2-ethanedisulfonate, bis(1-ethyl-1-methylpyrrolidinium) 1,2-ethanedisulfonate, bis(1-butyl-1-methylpyrrolidinium) 1,2-ethanedisulfonate, bis(1-methyl-1-propylpyrrolidinium) 1,2-ethanedisulfonate, bis(1-ethylpyridinium) 1,2-ethanedisulfonate, bis(1-ethyl-3-methylpyridinium) 1,2-ethanedisulfonate, bis(1-butyl-3-methylpyridinium) 1,2-ethanedisulfonate, bis(1-ethyl-4-methylpyridinium) 1,2-ethanedisulfonate, bis(1-butylpyridinium) 1,2-ethanedisulfonate, bis(1-butyl-4-methylpyridinium) 1,2-ethanedisulfonate, bis(tetramethylphosphonium) 1,2-ethanedisulfonate, bis(triethylmethylphosphonium) 1,2-ethanedisulfonate, bis(tetraethylphosphonium) 1,2-ethanedisulfonate, and the like.

Further, other specific examples of the onium salt having a divalent linking group include bis(tetraethylammonium) 1,4-butanedisulfonate, bis(tetra-n-butylammonium) 1,4-butanedisulfonate, bis(methyltri-n-octylammonium) 1,4-butanedisulfonate, bis(amyltriethylammonium) 1,4-butanedisulfonate, bis(cyclohexyltrimethylammonium) 1,4-butanedisulfonate, bis(1-ethyl-3-methylimidazolium) 1,4-butanedisulfonate, bis(1-ethyl-2,3-dimethylimidazolium) 1,4-butanedisulfonate, bis(1-butyl-3-methylimidazolium) 1,4-butanedisulfonate, bis(1-butyl-2,3-dimethylimidazolium) 1,4-butanedisulfonate, bis(1-methyl-3-n-octylimidazolium) 1,4-butanedisulfonate, bis(1-hexyl-3-methylimidazolium) 1,4-butanedisulfonate, bis(2-ethyl-1,3-dimethylimidazolium) 1,4-butanedisulfonate, bis(1,3-dimethyl-2-n-propylimidazolium) 1,4-butanedisulfonate, bis(1,3-dimethyl-2-n-pentylimidazolium) 1,4-butanedisulfonate, bis(2-n-heptyl-1,3-dimethylimidazolium) 1,4-butanedisulfonate, bis(1-ethyl-1-methylpiperidinium) 1,4-butanedisulfonate, bis(1-butyl-1-methylpiperidinium) 1,4-butanedisulfonate, bis(1-ethyl-1-methylpyrrolidinium) 1,4-butanedisulfonate, bis(1-butyl-1-methylpyrrolidinium) 1,4-butanedisulfonate, bis(1-methyl-1-propylpyrrolidinium) 1,4-butanedisulfonate, bis(1-ethylpyridinium) 1,4-butanedisulfonate, bis(1-ethyl-3-methylpyridinium) 1,4-butanedisulfonate, bis(1-butyl-3-methylpyridinium) 1,4-butanedisulfonate, bis(1-ethyl-4-methylpyridinium) 1,4-butanedisulfonate, bis(1-butylpyridinium) 1,4-butanedisulfonate, bis(1-butyl-4-methylpyridinium) 1,4-butanedisulfonate, bis(tetramethylphosphonium) 1,4-butanedisulfonate, bis(triethylmethylphosphonium) 1,4-butanedisulfonate, bis(tetraethylphosphonium) 1,4-butanedisulfonate, and the like.

Further, still other specific examples of the onium salt having a divalent linking group include bis(tetraethylammonium) 4,4'-biphenyldisulfonate, bis(tetra-n-butylammonium) 4,4'-biphenyldisulfonate, bis(methyltri-n-octylammonium) 4,4'-biphenyldisulfonate, bis(amyltriethylammonium) 4,4'-biphenyldisulfonate, bis(cyclohexyltrimethylammonium) 4,4'-biphenyldisulfonate, bis(1-ethyl-3-methylimidazolium) 4,4'-biphenyldisulfonate, bis(1-ethyl-2,3-dimethylimidazolium) 4,4'-biphenyldisulfonate, bis(1-butyl-3-methylimidazolium) 4,4'-biphenyldisulfonate, bis(1-butyl-2,3-dimethylimidazolium) 4,4'-biphenyldisulfonate, bis(1-methyl-3-n-octylimidazolium) 4,4'-biphenyldisulfonate, bis(1-hexyl-3-methylimidazolium) 4,4'-biphenyldisulfonate, bis(2-ethyl-1,3-dimethylimidazolium) 4,4'-biphenyldisulfonate, bis(1,3-dimethyl-2-n-propylimidazolium) 4,4'-biphenyldisulfonate, bis(1,3-dimethyl-2-n-pentylimidazolium) 4,4'-biphenyldisulfonate, bis(2-n-heptyl-1,3-dimethylimidazolium) 4,4'-biphenyldisulfonate, bis(1-ethyl-1-methylpiperidinium) 4,4'-biphenyldisulfonate, bis(1-butyl-1-methylpiperidinium) 4,4'-biphenyldisulfonate, bis(1-ethyl-1-methylpyrrolidinium) 4,4'-biphenyldisulfonate, bis(1-butyl-1-methylpyrrolidinium) 4,4'-biphenyldisulfonate, bis(1-methyl-1-propylpyrrolidinium) 4,4'-biphenyldisulfonate, bis(1-ethylpyridinium) 4,4'-biphenyldisulfonate, bis(1-ethyl-3-methylpyridinium) 4,4'-biphenyldisulfonate, bis(1-butyl-3-methylpyridinium) 4,4'-biphenyldisulfonate, bis(1-ethyl-4-methylpyridinium) 4,4'-biphenyldisulfonate, bis(1-butylpyridinium) 4,4'-biphenyldisulfonate, bis(1-butyl-4-methylpyridinium) 4,4'-biphenyldisulfonate, bis(tetramethylphosphonium) 4,4'-biphenyldisulfonate, bis(triethylmethylphosphonium) 4,4'-biphenyldisulfonate, bis(tetraethylphosphonium) 4,4'-biphenyldisulfonate, and the like.

Further, still other specific examples of the onium salt having a divalent linking group include bis(tetraethylammonium) 1,4-benzenedisulfonate, bis(tetra-n-butylammonium) 1,4-benzenedisulfonate, bis(methyltri-n-octylammonium) 1,4-benzenedisulfonate, bis(amyltriethylammonium) 1,4-benzenedisulfonate, bis(cyclohexyltrimethylammonium) 1,4-benzenedisulfonate, bis(1-ethyl-3-methylimidazolium) 1,4-benzenedisulfonate, bis(1-ethyl-2,3-dimethylimidazolium) 1,4-benzenedisulfonate, bis(1-butyl-3-methylimidazolium) 1,4-benzenedisulfonate, bis(1-butyl-2,3-dimethylimidazolium) 1,4-benzenedisulfonate, bis(1-methyl-3-n-octylimidazolium) 1,4-benzenedisulfonate, bis(1-hexyl-3-methylimidazolium) 1,4-benzenedisulfonate, bis(2-ethyl-1,3-dimethylimidazolium) 1,4-benzenedisulfonate, bis(1,3-dimethyl-2-n-propylimidazolium) 1,4-benzenedisulfonate, bis(1,3-dimethyl-2-n-pentylimidazolium) 1,4-benzenedisulfonate, bis(2-n-heptyl-1,3-dimethylimidazolium) 1,4-benzenedisulfonate, bis(1-ethyl-1-methylpiperidinium) 1,4-benzenedisulfonate, bis(1-butyl-1-methylpiperidinium) 1,4- benzenedisulfonate, bis(1-ethyl-1-methylpyrrolidinium) 1,4-benzenedisulfonate, bis(1-butyl-1-methylpyrrolidinium) 1,4-benzenedisulfonate, bis(1-methyl-1-propylpyrrolidinium) 1,4-benzenedisulfonate, bis(1-ethylpyridinium) 1,4-benzenedisulfonate, bis(1-ethyl-3-methylpyridinium) 1,4-benzenedisulfonate, bis(1-butyl-3-methylpyridinium) 1,4-benzenedisulfonate, bis(1-ethyl-4-methylpyridinium) 1,4-benzenedisulfonate, bis(1-butylpyridinium) 1,4-benzenedisulfonate, bis(1-butyl-4-methylpyridinium) 1,4-benzenedisulfonate, bis(tetramethylphosphonium) 1,4-benzenedisulfonate, bis(triethylmethylphosphonium) 1,4-benzenedisulfonate, bis(tetraethylphosphonium) 1,4-benzenedisulfonate, and the like.

Further, still other specific examples of the onium salt having a divalent linking group include bis(tetraethylammonium) 1,5-naphthalenedisulfonate, bis(tetra-n-butylammonium) 1,5-naphthalenedisulfonate, bis(methyltri-n-octylammonium) 1,5-naphthalenedisulfonate, bis(amyltriethylammonium) 1,5-naphthalenedisulfonate, bis(cyclohexyltrimethylammonium) 1,5-naphthalenedisulfonate, bis(1-ethyl-3-methylimidazolium) 1,5-naphthalenedisulfonate, bis(1-ethyl-2,3-dimethylimidazolium) 1,5-naphthalenedisulfonate, bis(1-butyl-3-methylimidazolium) 1,5-naphthalenedisulfonate, bis(1-butyl-2,3-dimethylimidazolium) 1,5-naphthalenedisulfonate, bis(1-methyl-3-n-octylimidazolium) 1,5-naphthalenedisulfonate, bis(1-hexyl-3-methylimidazolium) 1,5-naphthalenedisulfonate, bis(2-ethyl-1,3-dimethylimidazolium) 1,5-naphthalenedisulfonate, bis(1,3-dimethyl-2-n-propylimidazolium) 1,5-naphthalenedisulfonate, bis(1,3-dimethyl-2-n-pentylimidazolium) 1,5-naphthalenedisulfonate, bis(2-n-heptyl-1,3-dimethylimidazolium) 1,5-naphthalenedisulfonate, bis(1-ethyl-1-methylpiperidinium) 1,5-naphthalenedisulfonate, bis(1-butyl-1-methylpiperidinium) 1,5-naphthalenedisulfonate, bis(1-ethyl-1-methylpyrrolidinium) 1,5-naphthalenedisulfonate, bis(1-butyl-1-methylpyrrolidinium) 1,5-naphthalenedisulfonate, bis(1-methyl-1-propylpyrrolidinium) 1,5-naphthalenedisulfonate, bis(1-ethylpyridinium) 1,5-naphthalenedisulfonate, bis(1-ethyl-3-methylpyridinium) 1,5-naphthalenedisulfonate, bis(1-butyl-3-methylpyridinium) 1,5-naphthalenedisulfonate, bis(1-ethyl-4-methylpyridinium) 1,5-naphthalenedisulfonate, bis(1-butylpyridinium) 1,5-naphthalenedisulfonate, bis(1-butyl-4-methylpyridinium) 1,5-naphthalenedisulfonate, bis(tetramethylphosphonium) 1,5-naphthalenedisulfonate, bis(triethylmethylphosphonium) 1,5-naphthalenedisulfonate, bis(tetraethylphosphonium) 1,5-naphthalenedisulfonate, and the like.

Further, still other specific examples of the onium salt having a divalent linking group include bis(tetraethylammonium) diphenylether-4,4'-disulfonate, bis(tetra-n-butylammonium) diphenylether-4,4'-disulfonate, bis(methyltri-n-octylammonium) diphenylether-4,4'-disulfonate, bis(amyltriethylammonium) diphenylether-4,4'-disulfonate, bis(cyclohexyltrimethylammonium) diphenylether-4,4'-disulfonate, bis(1-ethyl-3-methylimidazolium) diphenylether-4,4'-disulfonate, bis(1-ethyl-2,3-dimethylimidazolium) diphenylether-4,4'-disulfonate, bis(1-butyl-3-methylimidazolium) diphenylether-4,4'-disulfonate, bis(1-butyl-2,3-dimethylimidazolium) diphenylether-4,4'-disulfonate, bis(1-methyl-3-n-octylimidazolium) diphenylether-4,4'-disulfonate, bis(1-hexyl-3-methylimidazolium) diphenylether-4,4'-disulfonate, bis(2-ethyl-1,3-dimethylimidazolium) diphenylether-4,4'-disulfonate, bis(1,3-dimethyl-2-n-propylimidazolium) diphenylether-4,4'-disulfonate, bis(1,3-dimethyl-2-n-pentylimidazolium) diphenylether-4,4'-disulfonate, bis(2-n-heptyl-1,3-dimethylimidazolium) diphenylether-4,4'-disulfonate, bis(1-ethyl-1-methylpiperidinium) diphenylether-4,4'-disulfonate, bis(1-butyl-1-methylpiperidinium) diphenylether-4,4'-disulfonate, bis(1-ethyl-1-methylpyrrolidinium) diphenylether-4,4'-disulfonate, bis(1-butyl-1-methylpyrrolidinium) diphenylether-4,4'-disulfonate, bis(1-methyl-1-propylpyrrolidinium) diphenylether-4,4'-disulfonate, bis(1-ethylpyridinium) diphenylether-4,4'-disulfonate, bis(1-ethyl-3-methylpyridinium) diphenylether-4,4'-disulfonate, bis(1-butyl-3-methylpyridinium) diphenylether-4,4'-disulfonate, bis(1-ethyl-4-methylpyridinium) diphenylether-4,4'-disulfonate, bis(1-butylpyridinium) diphenylether-4,4'-disulfonate, bis(1-butyl-4-methylpyridinium) diphenylether-4,4'-disulfonate, bis(tetramethylphosphonium) diphenylether-4,4'-disulfonate, bis(triethylmethylphosphonium) diphenylether-4,4'-disulfonate, bis(tetraethylphosphonium) diphenylether-4,4'-disulfonate, and the like.

Further, still other specific examples of the onium salt having a divalent linking group include bis(tetraethylammonium) 1,4-butanedioldisulfonate, bis(tetra-n-butylammonium) 1,4-butanedioldisulfonate, bis(methyltri-n-octylammonium) 1,4-butanedioldisulfonate, bis(amyltriethylammonium) 1,4-butanedioldisulfonate, bis(cyclohexyltrimethylammonium) 1,4-butanedioldisulfonate, bis(1-ethyl-3-methylimidazolium) 1,4-butanedioldisulfonate, bis(1-ethyl-2,3-dimethylimidazolium) 1,4-butanedioldisulfonate, bis(1-butyl-3-methylimidazolium) 1,4-butanedioldisulfonate, bis(1-butyl-2,3-dimethylimidazolium) 1,4-butanedioldisulfonate, bis(1-methyl-3-n-octylimidazolium) 1,4-butanedioldisulfonate, bis(1-hexyl-3-methylimidazolium) 1,4-butanedioldisulfonate, bis(2-ethyl-1,3-dimethylimidazolium) 1,4-butanedioldisulfonate, bis(1,3-dimethyl-2-n-propylimidazolium) 1,4-butanedioldisulfonate, bis(1,3-dimethyl-2-n-pentylimidazolium) 1,4-butanedioldisulfonate, bis(2-n-heptyl-1,3-dimethylimidazolium) 1,4-butanedioldisulfonate, bis(1-ethyl-1-methylpiperidinium) 1,4-butanedioldisulfonate, bis(1-butyl-1-methylpiperidinium) 1,4-butanedioldisulfonate, bis(1-ethyl-1-methylpyrrolidinium) 1,4-butanedioldisulfonate, bis(1-butyl-1-methylpyrrolidinium) 1,4-butanedioldisulfonate, bis(1-methyl-1-propylpyrrolidinium) 1,4-butanedioldisulfonate, bis(1-ethylpyridinium) 1,4-butanedioldisulfonate, bis(1-ethyl-3-methylpyridinium) 1,4-butanedioldisulfonate, bis(1-butyl-3-methylpyridinium) 1,4-butanedioldisulfonate, bis(1-ethyl-4-methylpyridinium) 1,4-butanedioldisulfonate, bis(1-butylpyridinium) 1,4-butanedioldisulfonate, bis(1-butyl-4-methylpyridinium) 1,4-butanedioldisulfonate, bis(tetramethylphosphonium) 1,4-butanedioldisulfonate, bis(triethylmethylphosphonium) 1,4-butanedioldisulfonate, bis(tetraethylphosphonium) 1,4-butanedioldisulfonate, and combinations of an anion represented by the following formula (5) and various cations.

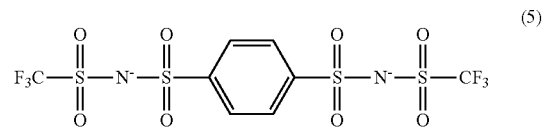

(5)

Further, specific examples of the onium salt having a trivalent linking group include tris(tetraethylammonium) naphthalene-1,3,6-trisulfonate, tris(tetra-n-butylammonium) naphthalene-1,3,6-trisulfonate, tris(methyltri-n-octylammonium) naphthalene-1,3,6-trisulfonate, tris(amyltriethylammonium) naphthalene-1,3,6-trisulfonate, tris(cyclohexyltrimethylammonium) naphthalene-1,3,6-trisulfonate, tris(1-ethyl-3-methylimidazolium) naphthalene-1,3,6-trisulfonate, tris(1-ethyl-2,3-dimethylimidazolium) naphthalene-1,3,6-trisulfonate, tris(1-butyl-3-methylimidazolium) naphthalene-1,3,6-trisulfonate, tris(1-butyl-2,3-dimethylimidazolium) naphthalene-1,3,6-trisulfonate, tris(1-methyl-3-n-octylimidazolium) naphthalene-1,3,6-trisulfonate, tris(1-hexyl-3-methylimidazolium) naphthalene-1,3,6-trisulfonate, tris(2-ethyl-1,3-dimethylimidazolium) naphthalene-1,3,6-trisulfonate, tris(1,3-dimethyl-2-n-propylimidazolium) naphthalene-1,3,6-trisulfonate, tris(1,3-dimethyl-2-n-pentylimidazolium) naphthalene-1,3,6-trisulfonate, tris(2-n-heptyl-1,3-dimethylimidazolium) naphthalene-1,3,6-trisulfonate, tris(1-ethyl-1-methylpiperidinium) naphthalene-1,3,6-trisulfonate, tris(1-butyl-1-methylpiperidinium) naphthalene-1,3,6-trisulfonate, tris(1-ethyl-1-methylpyrrolidinium) naphthalene-1,3,6-trisulfonate, tris(1-butyl-1-methylpyrrolidinium) naphthalene-1,3,6-trisulfonate, tris(1-methyl-1-propylpyrrolidinium) naphthalene-1,3,6-trisulfonate, tris(1-ethylpyridinium) naphthalene-1,3,6-trisulfonate, tris(1-ethyl-3-methylpyridinium) naphthalene-1,3,6-trisulfonate, tris(1-butyl-3-methylpyridinium) naphthalene-1,3,6-trisulfonate, tris(1-ethyl-4-methylpyridinium) naphthalene-1,3,6-trisulfonate, tris(1-butylpyridinium) naphthalene-1,3,6-trisulfonate, tris(1-butyl-4-methylpyridinium) naphthalene-1,3,6-trisulfonate, tris(tetramethylphosphonium) naphthalene-1,3,6-trisulfonate, tris(triethylmethylphosphonium) naphthalene-1,3,6-trisulfonate, tris(tetraethylphosphonium) naphthalene-1,3,6-trisulfonate, and the like.

Further, specific examples of the onium salt having a tetravalent linking group include tetrakis(tetraethylammonium) 1,3,6,8-pyrenetetrasulfonate, tetrakis(tetra-n-butylammonium) 1,3,6,8-pyrenetetrasulfonate, tetrakis(methyltri-n-octylammonium) 1,3,6,8-pyrenetetrasulfonate, tetrakis (amyltriethylammonium) 1,3,6,8-pyrenetetrasulfonate, tetrakis(cyclohexyltrimethylammonium) 1,3,6,8-pyrenetetratrisulfonate, tetrakis(1-ethyl-3-methylimidazolium) 1,3,6,8-pyrenetetrasulfonate, tetrakis(1-ethyl-2,3-dimethylimidazolium) 1,3,6,8-pyrenetetrasulfonate, tetrakis(1-butyl-3-methylimidazolium) 1,3,6,8-pyrenetetrasulfonate, tetrakis (1-butyl-2,3-dimethylimidazolium) 1,3,6,8-pyrenetetrasulfonate, tetrakis(1-methyl-3-n-octylimidazolium) 1,3,6,8-pyrenetetrasulfonate, tetrakis(1-hexyl-3-methylimidazolium) 1,3,6,8-pyrenetetrasulfonate, tetrakis(2-ethyl-1,3-dimethylimidazolium) 1,3,6,8-pyrenetetrasulfonate, tetrakis(1,3-dimethyl-2-n-propylimidazolium) 1,3,6,8-pyrenetetrasulfonate, tetrakis(1,3-dimethyl-2-n-pentylimidazolium) 1,3,6,8-pyrenetetrasulfonate, tetrakis(2-n-heptyl-1,3-dimethylimidazolium) 1,3,6,8-pyrenetetrasulfonate, tetrakis(1-ethyl-1-methylpiperidinium) 1,3,6,8-pyrenetetrasulfonate, tetrakis(1-butyl-1-methylpiperidinium) 1,3,6,8-pyrenetetrasulfonate, tetrakis (1-ethyl-1-methylpyrrolidinium) 1,3,6,8-pyrenetetrasulfonate, tetrakis(1-butyl-1-methylpyrrolidinium) 1,3,6,8-pyrenetetrasulfonate, tetrakis (1-methyl-1-propylpyrrolidinium) 1,3,6,8-pyrenetetrasulfonate, tetrakis(1-ethylpyridinium) 1,3,6,8-pyrenetetrasulfonate, tetrakis(1-ethyl-3-methylpyridinium) 1,3,6,8-pyrenetetrasulfonate, tetrakis(1-butyl-3-methylpyridinium) 1,3,6,8-pyrenetetrasulfonate, tetrakis(1-ethyl-4-methylpyridinium) 1,3,6,8-pyrenetetrasulfonate, tetrakis(1-butylpyridinium) 1,3,6,8-pyrenetetrasulfonate, tetrakis(1-butyl-4-methylpyridinium) 1,3,6,8-pyrenetetrasulfonate, tetrakis(tetramethylphosphonium) 1,3,6,8-pyrenetetrasulfonate, tetrakis(triethylmethylphosphonium) 1,3,6,8-pyrenetetrasulfonate, tetrakis(tetraethylphosphonium) 1,3,6,8-pyrenetetrasulfonate, and the like. These onium salts may be used alone or in combination of two of more.

The onium salt according to the present invention can be obtained by methods known in the art. For instance, they can be prepared from the corresponding onium halides as described in, Hiroyuki Ohno et al., J. Am. Chem. Soc., 2005, 27, 2398-2399; or in Peter Wasserscheid et al., Green Chemistry, 2002, 4, 134-138.

The content of the aforementioned onium salt (b) in the adhesive composition is, preferably from 10 to 20000 ppm, more preferably from 25 to 15000 ppm, and further preferably from 50 to 10000 ppm, per 100 parts by mass of 2-cyanoacrylic acid ester (a). When the content is within the above range, the effect of hardening acceleration is sufficiently exhibited, and the storage stability of the adhesive composition is kept good.

The reason why the aforementioned onium salt improves the adhesion rate on non-polar hard-to-bond materials and bond gap curability without impairing the storage stability of the adhesive composition is not yet clear, however, can be presumed as follows. Since the conjugate acid of the weakly nucleophilic anion that constitutes the onium salt is a strong acid, it releases an anion which is nucleophilic and thus serves as a polymerization initiator of the 2-cyanoacrylic acid ester when it reacts with a salt that is present on a surface of an adherend or in an air adjacent to the adhesive. On the other hand, since such a salt is not present during storage, the aforementioned anion exchange reaction does not take place to initiate the release of the highly reactive anion, so that excellent storage stability is maintained. Since the onium salt according to the present invention has a multifunctional structure in which two or more anions are linked together by way of a linking group, the linking group adheres or oriented to a non-polar adherend or an adjacent air to perform coupling function. As a result, the anion site tends to locate the interface or surface of adhesion, and thus becomes easier to cause the reaction with the salt.

The adhesive composition of the present invention may contain, in addition to the aforementioned onium salts, another hardening accelerator conventionally blended in these types of adhesive compositions. Examples of such hardening accelerators include polyalkylene oxides, crown ethers, silacrown ethers, calixarenes, cyclodextrins, and pyrogallol-based cyclic compounds.

The polyalkylene oxides refer to polyalkylene oxides and the derivatives thereof, and examples thereof include those disclosed in Japanese Patent Publication (Kokoku) No. Sho. 60-37836, Japanese Patent Publication (Kokoku) No. Hei. 1-43790, Japanese Patent Publication (Laid-open) No. Sho. 63-128088, Japanese Patent Publication (Laid-open) No. Hei. 3-167279, U.S. Pat. No. 4,386,193, and U.S. Pat. No. 4,424,327. Concrete examples thereof include (1) polyalkylene oxides such as diethylene glycol, triethylene glycol, polyethylene glycol, and polypropylene glycol; and (2) derivatives of polyalkylene oxides such as polyethylene glycol monoalkyl esters, polyethylene glycol dialkyl esters, polypropylene glycol dialkyl esters, diethylene glycol monoalkyl ethers, diethylene glycol dialkyl ethers, dipropylene glycol monoalkyl ethers, and dipropylene glycol dialkyl ethers.

Examples of the crown ethers include those disclosed in, for instance, Japanese Patent Publication (Kokoku) No. Sho. 55-2238 and Japanese Patent Publication (Laid-Open) No. Hei. 3-167279. Concrete examples thereof include 12-crown-4, 15-crown-5, 18-crown-6, benzo-12-crown-4, benzo-15-crown-5, benzo-18-crown-6, dibenzo-18-crown- 6, dibenzo-24-crown-8, dibenzo-30-crown-10, tribenzo-18-crown-6, asym-dibenzo-22-crown-6, dibenzo-14-crown-4, dicyclohexyl-24-crown-8, cyclohexyl-12-crown-4, 1,2-decalyl-15-crown-5, 1,2-naphtho-15-crown-5, 3,4,5-naphthyl-16-crown-5, 1,2-methylbenzo-18-crown-6, 1,2-tert-butyl-18-crown-6, and 1,2-vinylbenzo-15-crown-5. Examples of the silacrown ethers include, for example, those disclosed in Japanese Patent Publication (Laid-Open) No. Sho. 60-168775. Concrete examples thereof include dimethylsila-11-crown-4, dimethylsila-14-crown-5, and dimethylsila-17-crown-6.

Examples of the calixarenes include those disclosed in Japanese Patent Publication (Laid-Open) No. Sho. 60-179482, Japanese Patent Publication (Laid-Open) No. Sho. 62-235379, and Japanese Patent Publication (Laid-Open) No. Sho. 63-88152. Concrete examples thereof include 5,11,17,23,29,35-hexa-tert-butyl-37,38,39,40,41,42-hexahydroxycalix[6]arene, 37,38,39,40,41,42-hexahydroxycalix[6]arene, 37,38,39,40,41,42-hexa-(2-oxo-2-ethoxy)-ethoxycalix[6]arene, 25,26,27,28-tetra-(2-oxo-2-ethoxy)-ethoxycalix[4]arene, and tetraethyl 4-tert-butylcalix[4]arene-O,O',O'',O'''-tetraacetate. Examples of the cyclodextrins include those disclosed in Japanese Patent Publication (Kohyo) No. Hei. 5-505835. Concrete examples thereof include α-, β-, or γ-cyclodextrins. Examples of the pyrogallol-based cyclic compounds include compounds disclosed in Japanese Patent Publication (Laid-Open) No. 2000-191600. Concrete examples thereof include 3,4,5,10,11,12,17,18,19,24,25,26-dodecaethoxycarbomethoxy-C-1,C-8,C-15,C-22-tetramethyl[14]-metacyclophane. These hardening accelerators may be used either alone or in combination of two or more thereof.

In the adhesive composition, the content of the hardening accelerators other than the onium salt is preferably from 10 to 30000 ppm, more preferably from 50 to 20000 ppm, and most preferably from 100 to 10000 ppm relative to 100 parts by mass of 2-cyanoacrylic acid ester. The adhesive composition can be improved in the adhesion rate on various adherends without impairing the storage stability so long as the content falls within the range of from 10 to 30000 ppm.

In addition to the above hardening accelerator, the adhesive composition of the present invention may contain stabilizers, plasticizers, thickeners, particles, colorants, fragrances, solvents, strength improvers or others that have conventionally been employed in adhesive compositions containing 2-cyanoacrylic acid ester, depending on the objectives, in proper amounts that do not impair curability, adhesion strength or the like of the adhesive composition.

The stabilizers include (1) anion polymerization inhibitors, such as sulfur dioxide, aliphatic sulfonates such as methanesulfonate, aromatic sulfonates such as p-toluenesulfonate, boron trifluoride complexes such as boron trifluoride methanol and boron trifluoride diethyl ether, $HBF_4$, and trialkyl borate; and (2) radical polymerization inhibitors such as hydroquinone, hydroquinone monomethyl ether, t-butylcatechol, catechol, and pyrogallol. These stabilizers may be used alone, or in a combination of two or more thereof.

The plasticizers include triethyl acetyl citrate, tributyl acetyl citrate, dimethyl adipate, diethyl adipate, dimethyl sebacate, dimethyl phthalate, diethyl phthalate, dibutyl phthalate, diisodecyl phthalate, dihexyl phthalate, diheptyl phthalate, dioctyl phthalate, bis(2-ethylhexyl) phthalate, diisononyl phthalate, diisotridecyl phthalate, dipentadecyl phthalate, dioctyl terephthalate, diisononyl isophthalate, decyl toluate, bis(2-ethylhexyl) camphorate, 2-ethylhexylcyclohexyl carboxylate, diisobutyl fumarate, diisobutyl maleate, caproic triglyceride, 2-ethylhexyl benzoate, and dipropylene glycol dibenzoate. Among them, preferred from the viewpoint of good miscibility with 2-cyanoacrylic acid ester and of high plasticizing efficiency are tributyl acetyl citrate, dimethyl adipate, dimethyl phthalate, 2-ethylhexyl benzoate, and dipropylene glycol dibenzoate. These plasticizers may be used alone or in combination of two or more thereof.

The thickeners include polymethylmethacrylates, copolymers of methylmethacrylate and an acrylate, copolymers of methylmethacrylate and another methacrylate, acrylic rubbers, polyvinylchloride, polystyrene, cellulose esters, polyalkyl-2-cyanoacrylate, and ethylene-vinyl acetate copolymers. These thickeners may be used either alone or in combination of two or more thereof.

EXAMPLES

The present invention is explained in further detail by way of Examples below. However, the present invention is not limited to these Examples, but various modifications and changes can be made to the present invention without departing from the gist of the present invention. In the description below, parts and percentages are based on mass unless otherwise mentioned.

1. Evaluation Method (1) Adhesion Rate

Natural rubber: A natural rubber tube having an inner diameter of 6 mm and an outer diameter of 10 mm was cut by a cutter, and then the cutting surfaces were bonded together with the adhesive composition according to the present invention and stood still for a predetermined time to fix. A period until the tensile adhesion strength reached over 0.16 $N/mm^2$ was taken as adhesion time.

Bond gap curability: Two square columns were provided as test pieces which were made of polyvinyl chloride resin (12.7 mm (vertical)×12.7 mm (transverse)×38 mm (length)). A polyethylene mesh (NIP (polyethylene) strong net (trade name) manufactured by NBC Meshtec Inc.; product number 200; 30 mm (length)×30 mm (width)×100 μm (thickness)) was sandwiched between the end surfaces (12.7 mm (vertical)×12.7 mm (transverse)) of the two square columns to bond them together and stood still for a predetermined time to fix. A period until the tensile adhesion strength reached over 0.16 $N/mm^2$ was taken as adhesion time.

(2) Viscosity

Viscosity was measured using E-type viscometer at 25° C. and 100 rpm.

(3) Storage Stability

Evaluation was made by comparing the viscosity measured at the initial stage with the viscosity measured after storage for one week under the environment of 50° C. and 95% RH. For the storage, 1.5 g of the adhesive composition was sealed in a 2 g polyethylene container.

2. Synthesis of Onium Salt

Synthesis Example 1

In a 50-ml eggplant shape flask were charged 1.466 g (10.00 mmol) of 1-ethyl-3-methylimidazolium chloride (see Table 1), 13.2 g (20 mg chemical equivalent) of anion exchange resin (AMBERLITE IRA900A OH AG (trade name), strong base type, manufactured by Organo Corporation), and 25 ml of ion-exchange water, and were stirred for 48 hours under room temperature. After filtering off the ion exchange resin, 5 ml solution in ion-exchanged water of 1.572 g (5.00 mmol) of 4,4'-biphenyldisulfonic acid (see Table 1) was slowly dropped into the resulting product under ice cooling. Then, the ice bath was removed, and additional stirring was continued for 12 hours under room temperature. Then, the reaction solution was rinsed with 25 ml of toluene, purified with ion exchange resin, and then condensed under reduced pressure. The thus-obtained residue was dissolved in 25 ml of methanol to filter off the insoluble matter. The solvent was distilled away under reduced pressure to obtain 2.540 g of onium salt A (bis(1-ethyl-3-methylimidazolium) 4,4'-biphenyldisulfonate) (see Table 1) as pale yellow solid.

Synthesis Example 2

In a 50-ml eggplant shape flask were charged 4.042 g (10.00 mmol) of methyltri-n-octylammonium chloride (see Table 1), 13.2 g (20 mg chemical equivalent) of anion exchange resin (AMBERLITE IRA900A OH AG (trade name), strong base type, manufactured by Organo Corporation), and 20 ml of toluene, and were stirred for 48 hours under room temperature. After filtering off the ion exchange resin, 5 ml solution in ion-exchanged water of 1.572 g (5.00 mmol) of 4,4'-biphenyldisulfonic acid (see Table 1) was slowly dropped into the resulting product under ice cooling. Then, the ice bath was removed, and additional stirring was continued for 12 hours under room temperature. Then, the reaction solution was rinsed with 10 ml of ion exchanged water three times, and then condensed under reduced pressure. The thus-obtained residue was dissolved in 25 ml of methanol to filter off the insoluble matter. The solvent was distilled away under reduced pressure to obtain 4.847 g of onium salt B (bis(methyltri-n-octylammonium) 4,4'-biphenyldisulfonate) (see Table 1) as pale yellow semi-solid.

Synthesis Examples 3-5 and 7

Onium salts were synthesized in accordance with Synthetic Example 1, except that various quaternary nitrogen containing halides and sulfonic acids shown in Table 1 were used as raw materials in the charging amounts shown in Table 1.

Synthesis Examples 6, 8 and 9

Onium salts were synthesized in accordance with Synthetic Example 2, except that various quaternary nitrogen containing halides and sulfonic acids shown in Table 1 were used as raw materials in the charged amounts shown in Table 1.

TABLE 1

| Synthesis Example | Onium Salt Type | Yield (g) | Compounds used for synthesis of onium salts | | | |
|---|---|---|---|---|---|---|
| | | | Quaternary nitrogen containing halides | Charged Amount (g) | Sulfonic acid | Charged Amount (g) |
| 1 | A | 2.540 | 1-ethyl-3-methylimidazolium chloride | 1.466 | 4,4'-biphenyldisulfonic acid | 1.572 |
| 2 | B | 4.847 | methyltri-n-octylammonium chloride | 4.042 | 4,4'-biphenyldisulfonic acid | 1.572 |
| 3 | C | 2.692 | 1-butyl-3-methylpyridinium bromide | 2.301 | 4,4'-biphenyldisulfonic acid | 1.572 |
| 4 | D | 2.617 | 1-butyl-1-methylpyrrolidinium chloride | 1.777 | 4,4'-biphenyldisulfonic acid | 1.572 |
| 5 | E | 2.143 | 1-ethyl-3-methylimidazolium chloride | 1.466 | 1,2-ethanedisulfonic acid dihydrate | 1.131 |
| 6 | F | 4.568 | methyltri-n-octylammonium chloride | 4.042 | 1,2-ethanedisulfonic acid dihydrate | 1.131 |
| 7 | G | 2.262 | 1-ethyl-3-methylimidazolium chloride | 1.606 | 1,4-butanedisulfonic acid | 1.091 |
| 8 | H | 4.578 | methyltri-n-octylammonium chloride | 4.042 | 1,4-butanedisulfonic acid | 1.091 |
| 9 | I | 4.314 | methyltri-n-octylammonium chloride | 4.042 | methanesulfonic acid | 0.961 |

3. Preparation of 2-Cyanoacrylate-Based Adhesive Composition

Examples 1-10 and Comparative Example 1-5

To ethyl 2-cyanoacrylate were added 40 ppm of sulfur dioxide and 1000 ppm of hydroquinone (with respect to 100 parts by mass of ethyl 2-cyanoacrylate), and various onium salts or additives were blended therewith to obtain adhesive compositions which were then subjected to various tests. The results are given in Tables 2 and 3.

TABLE 2

| | | Onium salt | | | Adhesion rate (seconds) | | Viscosity (mPa · s) | |
|---|---|---|---|---|---|---|---|---|
| | | Type | | Content (ppm) | Natural rubber | Bond gap | Initial | After 1 week (50° C., 95% RH) |
| Example | 1 | bis(1-ethyl-3-methylimidazolium) 4,4'-biphenyldisulfonate | A | 100 | 20 | 90 | 2.2 | 2.4 |
| | 2 | bis(1-ethyl-3-methylimidazolium) 4,4'-biphenyldisulfonate | A | 500 | 10 | 45 | 2.5 | 2.7 |
| | 3 | bis(methyltri-n-octylammonium) 4,4'-biphenyldisulfonate | B | 100 | 20 | 60 | 2.4 | 2.6 |

TABLE 2-continued

| | | Onium salt | | | Adhesion rate (seconds) | | Viscosity (mPa · s) | |
|---|---|---|---|---|---|---|---|---|
| | | Type | Content (ppm) | Natural rubber | Bond gap | Initial | After 1 week (50° C., 95% RH) | |
| | 4 | bis(methyltri-n-octylammonium) 4,4'-biphenyldisulfonate | B | 200 | 10 | 60 | 2.4 | 2.7 |
| | 5 | bis(1-butyl-3-methylpyridinium) 4,4'-biphenyldisulfonate | C | 10000 | 5 | 30 | 3.9 | 4.9 |
| | 6 | bis(1-butyl-1-methylpyrrolidinium) 4,4'-biphenyldisulfonate | D | 150 | 20 | 60 | 2.5 | 2.8 |
| | 7 | bis(1-ethyl-3-methylimidazolium) 1,2-ethanedisulfonate | E | 75 | 15 | 45 | 2.5 | 2.7 |
| | 8 | bis(methyltri-n-octylammonium) 1,2-ethanedisulfonate | F | 100 | 10 | 30 | 2.6 | 2.8 |
| | 9 | bis(1-ethyl-3-methylimidazolium) 1,4-butanedisulfonate | G | 200 | 15 | 60 | 2.4 | 2.8 |
| | 10 | bis(methyltri-n-octylammonium) 1,4-butanedisulfonate | H | 100 | 20 | 90 | 2.3 | 2.5 |

TABLE 3

| | | Additive | | | Adhesion rate (seconds) | | Viscosity (mPa · s) | |
|---|---|---|---|---|---|---|---|---|
| | | Type | Trade name | Content (ppm) | Natural Rubber | Bond gap | Initial | After 1 week (50° C., 95% RH) |
| Comparative Example | 1 | 15-Crown-5 | Crown Ether O-15, manufactured by NIPPON SODA CO., LTD. | 2500 | 30 | 120 | 2.1 | 2.3 |
| | 2 | Tetraethyl 4-tert-Butylcalix[4]arene-O,O',O'',O'''-tetraacetate | CALIX B4-EA, manufactured by Sugai Chemical IND. CO., LTD. | 2000 | 30 | 120 | 2.2 | 2.4 |
| | 3 | 1-ethyl-3-methylimidazolium methanesulfonate | Reagent, Tokyo Chemical Industry Co., Ltd. | 200 | 30 | 300 | 2.5 | 2.8 |
| | 4 | Methyltri-n-octylammonium methanesulfonate | Onium salt I | 150 | 30 | 300 | 2.5 | 2.9 |
| | 5 | Additive-free | — | — | 90 | 300 | 2.1 | 2.1 |

The results in Tables 2 and 3 show that the adhesive compositions in Examples 1-10 exhibit excellent adhesion rates on natural rubber and good bond gap curability, compared with the adhesive compositions containing conventional hardening accelerators (Comparative Examples 1 and 2) and the adhesive compositions containing onium salts falling outside the present invention (Comparative Examples 3 and 4), and also show a viscosity change of 1.3 or less even after one week at 50° C. and 95% RH, and thus are excellent in storage stability.

INDUSTRIAL APPLICABILITY

The present invention which is based on 2-cyanoacrylic acid ester can be utilized as a so-called instantaneous adhesive in a wide range of products and technical fields in various types of industrial fields including household and medical fields, and is particularly useful for adhesion of hard-to-bond materials and adhesion in the case, for example, where convex or concavo exits on surfaces of adherends or the case where there is a gap between adherends.

The invention claimed is:

1. A 2-cyanoacrylate-based adhesive composition which comprises (a) a 2-cyanoacrylic acid ester and (b) an onium salt represented by the following formula (1):

$$nC^+A^-{}_n\text{-}X \quad (1)$$

wherein, in formula (1),
C+ represents an onium cation,
A− represents at least one anion selected from the group consisting of —$SO_3^-$, —$OSO_3^-$ and an imide anion represented by the following formula (2),
X represents a linking group comprising an organic group, which connects at least two anions together, and
n is an integer of 2 or more,

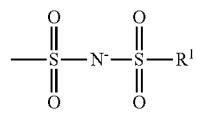

(2)

wherein, in formula (2), $R^1$ represents a fluorine atom, alkyl group, cycloalkyl group, perfluoroalkyl group, aryl group, aralkyl group, alkenyl group or alkynyl group.

2. The 2-cyanoacrylate-based adhesive composition according to claim 1, wherein the cation of the onium salt (b) is at least one onium cation selected from a group consisting of a quaternary ammonium cation, a quaternary phosphonium cation, an imidazolium cation, a pyridinium cation, and a tertiary sulfonium cation.

3. The 2-cyanoacrylate-based adhesive composition according to claim 1, wherein the anion of the onium salt (b) is at least one anion selected from a group consisting of —$SO_3^-$, —$OSO_3^-$, a fluorosulfonylimide anion and a perfluoroalkylsulfonylimide anion.

4. The 2-cyanoacrylate-based adhesive composition according to claim 1, wherein the linking group X in formula (1) is a divalent linking group.

5. The 2-cyanoacrylate-based adhesive composition according to claim 4, wherein the linking group X in formula (1) is at least one divalent linking group selected from the group consisting of an alkylene group, a cycloalkylene group, an arylene group and a biphenyl group.

6. The 2-cyanoacrylate-based adhesive composition according to claim 1, wherein the content of the onium salt (b) is 10 to 20,000 ppm relative to 100 parts by mass of the 2-cyanoacrylic acid ester (a).

7. The 2-cyanoacrylate-based adhesive composition according to claim 1, wherein the organic group contains an aromatic ring, a double bond, a triple bond, a cyclic structure, an ester bond, an ether bond, a thioether bond, a siloxane bond, or a combination thereof.

8. The 2-cyanoacrylate-based adhesive composition according to claim 1, wherein the linking group comprises a divalent, trivalent or tetravalent organic group.

9. The 2-cyanoacrylate-based adhesive composition according to claim 8, wherein said organic group comprises a hydrocarbon group.

10. The 2-cyanoacrylate-based adhesive composition according to claim 8, wherein said organic group comprises a divalent hydrocarbon group.

11. The 2-cyanoacrylate-based adhesive composition according to claim 8, wherein said organic group comprises a trivalent hydrocarbon group.

12. The 2-cyanoacrylate-based adhesive composition according to claim 8, wherein said organic group comprises a tetravalent hydrocarbon group.

13. The 2-cyanoacrylate-based adhesive composition according to claim 8, wherein the cation of the onium salt (b) is at least one onium cation selected from a group consisting of a quaternary ammonium cation, a quaternary phosphonium cation, an imidazolium cation, a pyridinium cation, and a tertiary sulfonium cation.

14. The 2-cyanoacrylate-based adhesive composition according to claim 8, wherein the anion of the onium salt (b) is at least one anion selected from the group consisting of $-SO_3^-$, $-OSO_3^-$, a fluorosulfonylimide anion and a perfluoroalkylsulfonylimide anion.

15. The 2-cyanoacrylate-based adhesive composition according to claim 8, wherein the anion of the onium salt (b) is at least one anion selected from the group consisting of $-SO_3^-$ and $-OSO_3^-$.

16. The 2-cyanoacrylate-based adhesive composition according to claim 8, wherein the content of the onium salt (b) is 10 to 20,000 ppm relative to 100 parts by mass of the 2-cyanoacrylic acid ester (a).

17. The 2-cyanoacrylate-based adhesive composition according to claim 1, wherein the linking group comprises a hydrocarbon group, wherein the hydrocarbon group optionally includes a substituent, an aromatic ring, a double bond, a triple bond, a cyclic structure, an ester bond, an ether bond, a thioether bond, a siloxane bond or a combination thereof, wherein said substituent comprises an alkanoyl group, a halogen atom, a silyl group, a nitro group, an azide group, a cyano group, or a nitroso group.

18. A 2-cyanoacrylate-based adhesive composition which comprises
   (a) a 2-cyanoacrylic acid ester; and
   (b) an onium salt represented by the following formula (1):

$$nC^+A^-_n\text{-}X \tag{1}$$

wherein
   $C^+$ represents an onium cation comprising at least one onium cation selected from a group consisting of a quaternary ammonium cation, a quaternary phosphonium cation, an imidazolium cation, a pyridinium cation, and a tertiary sulfonium cation,
   $A^-$ represents at least one anion selected from the group consisting of $-SO_3^-$, $-OSO_3^-$ and an imide anion,
   X represents a linking group comprising a divalent organic group, which connects at least two anions together,
   n is an integer of 2 or more, and
   said imide anion is represented by the following formula (2)

wherein $R^1$ represents a fluorine atom, alkyl group, cycloalkyl group, perfluoroalkyl group, aryl group, aralkyl group, alkenyl group or alkynyl group.

19. The 2-cyanoacrylate-based adhesive composition according to claim 18, wherein the anion of the onium salt (b) is at least one anion selected from a group consisting of $-SO_3^-$, $-OSO_3^-$, a fluorosulfonylimide anion and a perfluoroalkylsulfonylimide anion.

20. The 2-cyanoacrylate-based adhesive composition according to claim 19, wherein the divalent linking group X in general formula (1) comprises a divalent linking group selected from the group consisting of an alkylene group, a cycloalkylene group, an arylene group and a biphenyl group.

21. The 2-cyanoacrylate-based adhesive composition according to claim 18, wherein the content of the onium salt (b) is 10 to 20,000 ppm relative to 100 parts by mass of the 2-cyanoacrylic acid ester (a).

* * * * *